United States Patent
Wong

(10) Patent No.: US 12,431,786 B2
(45) Date of Patent: Sep. 30, 2025

(54) CONTROL CIRCUIT AND CONTROL METHOD FOR SWITCHED CAPACITOR CONVERTER

(71) Applicant: Joulwatt Technology Co., Ltd., Hangzhou (CN)

(72) Inventor: Pitleong Wong, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 258 days.

(21) Appl. No.: 18/202,327

(22) Filed: May 26, 2023

(65) Prior Publication Data

US 2023/0387784 A1 Nov. 30, 2023

(30) Foreign Application Priority Data

May 27, 2022 (CN) .......................... 202210591796.7

(51) Int. Cl.
*H02M 3/07* (2006.01)
*H02M 1/00* (2006.01)
*H02M 1/088* (2006.01)
*H02M 3/158* (2006.01)

(52) U.S. Cl.
CPC .......... *H02M 1/088* (2013.01); *H02M 1/0095* (2021.05); *H02M 3/07* (2013.01); *H02M 3/158* (2013.01)

(58) Field of Classification Search
CPC ........ H02M 3/07; H02M 3/158; H02M 3/071; H02M 3/072; H02M 3/073; H02M 3/076; H02M 3/077; H02M 3/1582; H02M 3/1584; H02M 1/008; H02M 1/0095; H02M 1/096; H02M 1/084; H02M 1/0845

See application file for complete search history.

(56) References Cited

U.S. PATENT DOCUMENTS 10,554,124 B1 * 2/2020 Mangudi ................. H02M 1/08
2021/0083572 A1 * 3/2021 Yen ............................ H02J 7/06

* cited by examiner

*Primary Examiner* — Nguyen Tran
(74) *Attorney, Agent, or Firm* — Bayramoglu Law Offices LLC

(57) ABSTRACT

A control circuit and control method for a switched capacitor converter (SCC) are provided. An adjustment circuit makes adjustment with a small pull-down current, such that two terminal voltages of a flying capacitor are consistent with an output voltage. Before the SCC works formally for voltage conversion, the two terminal voltages of the flying capacitor are the same as the output voltage.

16 Claims, 4 Drawing Sheets

US 12,431,786 B2

CONTROL CIRCUIT AND CONTROL METHOD FOR SWITCHED CAPACITOR CONVERTER

CROSS REFERENCE TO THE RELATED APPLICATIONS

This application is based upon and claims priority to Chinese Patent Application No. 202210591796.7, filed on May 27, 2022, the entire contents of which are incorporated herein by reference.

TECHNICAL FIELD

The present disclosure relates to the technical field of power electronics, and in particular to a control circuit and control method for a switched capacitor converter (SCC).

BACKGROUND

As a direct current (DC-DC) conversion system, the SCC is intended to convert a received input voltage into an expected output voltage. It can adjust the output voltage as a multiple (such as 2 times) of the input voltage or as a fraction (such as ½) of the input voltage. As shown in FIG. 1, a common SCC includes switching transistors Q1-Q4 connected between a reference ground and an input voltage. The switching transistor Q1 and the switching transistor Q2 are turned on or off complementarily, as well as the switching transistor Q3 and the switching transistor Q4 are turned on or off complementarily. A flying capacitor CF includes a first terminal connected to a common node for the switching transistor Q1 and the switching transistor Q2, and a second terminal connected to a common node for the switching transistor Q3 and the switching transistor Q4. An output capacitor C1 includes one terminal connected to the reference ground, and the other terminal provided with a voltage as an output voltage Vo.

In response to a 2:1 step-down conversion of the SCC, the switching transistor approximately have a duty cycle of 0.5. Before the SCC works, two terminal voltages of the flying capacitor and the output voltage each are about a half of the input voltage. However, in an actual circuit, due to failures such as a short circuit, either the two terminal voltages of the flying capacitor or the output voltage is not half of the input voltage. In this case, if the switching transistors are directly turned on to connect the input voltage, a large instantaneous current may flow through the switching transistors or the flying capacitor that affects the working reliability of a circuit device.

SUMMARY

In view of this, an objective of the present disclosure is to provide a control circuit and control method for an SCC, to solve the technical problem of damage to a circuit device for an uncontrollable voltage of the SCC in the prior art.

The present disclosure provides a control circuit for an SCC. The SCC includes a first switching transistor, a second switching transistor, a third switching transistor and a fourth switching transistor sequentially connected between a reference ground and an input voltage, a flying capacitor, and an output capacitor; the flying capacitor includes a first terminal connected to a common node for the first switching transistor and the second switching transistor, and a second terminal connected to a common node for the third switching transistor and the fourth switching transistor; the output capacitor includes a first terminal connected to the reference ground, and a second terminal voltage as an output voltage of the SCC; the control circuit includes a switching signal generation circuit and an adjustment circuit; the switching signal generation circuit is configured to generate a switching control signal for controlling the first switching transistor, the second switching transistor, the third switching transistor and the fourth switching transistor; the adjustment circuit receives a first terminal voltage and a second terminal voltage of the flying capacitor, and pulls down the first terminal voltage and the second terminal voltage of the flying capacitor through a pull-down signal to make two terminal voltages of the flying capacitor consistent with the output voltage; the switching signal generation circuit turns off the first switching transistor, the second switching transistor, the third switching transistor and the fourth switching transistor; and after the two terminal voltages of the flying capacitor are consistent with the output voltage, the switching signal generation circuit controls the first switching transistor, the second switching transistor, the third switching transistor and the fourth switching transistor to work for voltage conversion.

Preferably, the pull-down signal refers to a current signal having a current value within a preset range; and the preset range is greater than zero and less than 1 A.

Preferably, after the adjustment circuit adjusts the second terminal voltage of the flying capacitor to a same potential as the second terminal voltage of the output capacitor, the switching signal generation circuit turns on the third switching transistor, and the adjustment circuit adjusts the first terminal voltage of the flying capacitor to a same potential as the reference ground.

Preferably, the adjustment circuit pulls down the second terminal voltage of the flying capacitor through the pull-down signal to a same potential as the second terminal voltage of the output capacitor; and the adjustment circuit pulls down the first terminal voltage of the flying capacitor through the pull-down signal to a same potential as the reference ground.

Preferably, the adjustment circuit includes a switching circuit; two terminals of the switching circuit are respectively connected to the second terminal of the flying capacitor and a second terminal of the output capacitor; after the second terminal voltage of the flying capacitor is pulled down to the same potential as the second terminal voltage of the output capacitor, the two terminals of the switching circuit are connected to the first terminal of the flying capacitor and the reference ground; and a working current of the switching circuit serves as the pull-down signal.

Preferably, the switching circuit includes any one of a switching transistor, a resistor and a switching transistor connected in series, and a switching transistor and a current source connected in series.

Preferably, the pull-down signal includes a first pull-down signal and a second pull-down signal; the adjustment circuit pulls down the second terminal voltage of the flying capacitor through the first pull-down signal to a same potential as the second terminal voltage of the output capacitor; and the adjustment circuit pulls down the first terminal voltage of the flying capacitor through the second pull-down signal to a same potential as the reference ground.

Preferably, the adjustment circuit includes a first switching circuit and a second switching circuit; two terminals of the first switching circuit are respectively connected to the second terminal of the flying capacitor and a second terminal of the output capacitor; two terminals of the second switching circuit are respectively connected to the first terminal of the flying capacitor and the reference ground; a working current of the first switching circuit serves as the first pull-down signal; and a working current of the second switching circuit serves as the second pull-down signal.

Preferably, the first switching circuit includes any one of a switching transistor, a resistor and a switching transistor connected in series, and a switching transistor and a current source connected in series; and the second switching circuit includes any one of a switching transistor, a resistor and a switching transistor connected in series, and a switching transistor and a current source connected in series.

Preferably, the control circuit further includes a driving voltage circuit; the driving voltage circuit includes a bootstrap capacitor; the bootstrap capacitor provides a driving voltage for a logical and driving circuit in the control circuit; an upper pole plate of the bootstrap capacitor is connected to the input voltage through a diode; a lower pole plate of the bootstrap capacitor is connected to a switch to receive a pulse signal; the diode is turned on, such that the bootstrap capacitor is charged through the input voltage; the switch is turned on to pull down a terminal voltage of the lower pole plate of the bootstrap capacitor through a first signal; and after the terminal voltage of the lower pole plate is pulled down to a zero potential, the switching signal generation circuit controls the first switching transistor, the second switching transistor, the third switching transistor and the fourth switching transistor to work for the voltage conversion.

Preferably, the first signal refers to a current signal having a current value within a preset range; and the preset range is greater than zero and less than 1 A.

Preferably, the SCC includes two phases of structurally same switched capacitor (SC) circuits; the first switching transistor, the second switching transistor, the third switching transistor, the fourth switching transistor and the flying capacitor form a first phase of SC circuit; and a frequency of the pulse signal is twice a switching frequency of each of the SC circuits.

Preferably, the control circuit further includes a detection circuit; after the first switching transistor and the third switching transistor are turned off, the switching signal generation circuit generates a second switching control signal to turn on the second switching transistor, and the detection circuit detects the second terminal voltage of the flying capacitor, as well as a voltage difference between the second terminal voltage of the flying capacitor and the input voltage; and when an absolute value of the voltage difference falls within a preset range, the switching signal generation circuit generates a fourth switching control signal to turn on the fourth switching transistor.

According to a second aspect, the present disclosure provides a control method for an SCC. The SCC includes a first switching transistor, a second switching transistor, a third switching transistor and a fourth switching transistor sequentially connected between a reference ground and an input voltage, a flying capacitor, and an output capacitor, where the flying capacitor includes a first terminal connected to a common node for the first switching transistor and the second switching transistor, and a second terminal connected to a common node for the third switching transistor and the fourth switching transistor; the output capacitor includes a first terminal connected to the reference ground, and a second terminal voltage as an output voltage of the SCC; and the control method includes the following steps: turning off the first switching transistor, the second switching transistor, the third switching transistor and the fourth switching transistor; pulling down a first terminal voltage and a second terminal voltage of the flying capacitor through a pull-down signal to make two terminal voltages of the flying capacitor consistent with the output voltage; and allowing, after the two terminal voltages of the flying capacitor are consistent with the output voltage, a switching signal generation circuit to control the switching transistor, the second switching transistor, the third switching transistor and the fourth switching transistor to work for voltage conversion.

Preferably, the pull-down signal refers to a current signal having a current value within a preset range; and the preset range is greater than zero and less than 1 A.

Preferably, the pulling down a first terminal voltage and a second terminal voltage of the flying capacitor through a pull-down signal to make two terminal voltages of the flying capacitor consistent with the output voltage specifically includes: adjusting the second terminal voltage of the flying capacitor through the pull-down signal to a same potential as the second terminal voltage of the output capacitor; allowing the switching signal generation circuit to turn on the third switching transistor; and adjusting the first terminal voltage of the flying capacitor through the pull-down signal to a same potential as the reference ground.

Preferably, the control method further includes: providing a driving voltage through a bootstrap capacitor, where an upper pole plate of the bootstrap capacitor is connected to the input voltage through a diode, a lower pole plate of the bootstrap capacitor is connected to a switch to receive a pulse signal, and a first signal refers to a current signal having a current value within a preset range; turning on the diode, such that the bootstrap capacitor is charged through the input voltage; turning on the switch to pull down a terminal voltage of the lower pole plate of the bootstrap capacitor through the first signal; controlling, after the terminal voltage of the lower pole plate is pulled down to a zero potential, the first switching transistor, the second switching transistor, the third switching transistor and the fourth switching transistor to work for the voltage conversion.

Preferably, the control method further includes: turning on the second switching transistor after the first switching transistor and the third switching transistor are turned off; detecting the second terminal voltage of the flying capacitor, as well as a voltage difference between the second terminal voltage of the flying capacitor and the input voltage; and turning on the fourth switching transistor when an absolute value of the voltage difference falls within a preset range.

According to the circuit structure of the present disclosure, an adjustment circuit makes adjustment with a small current, such that two terminal voltages of a flying capacitor are the same as an output voltage. Before the SCC works formally, the two terminal voltages of the flying capacitor are consistent with the output voltage. The control circuit for an SCC provided by the present disclosure can achieve a controllable voltage before the SCC works formally, thereby protecting components in the circuit from a large current impact, and preventing damage to the components.

DETAILED DESCRIPTION OF THE EMBODIMENTS

The preferred embodiments of the present disclosure are described in detail below with reference to the drawings, but the present disclosure is not limited to these embodiments. The present disclosure covers any substitution, modification, equivalent method and solution made within the spirit and scope of the present disclosure.

For a better understanding of the present disclosure, the specific details of the following preferred embodiments of the present disclosure are explained hereinafter in detail, while the present disclosure can also be fully understood by those skilled in the art without the description of these details.

The present disclosure is described in detail by giving examples with reference to the drawings. It should be noted that the drawings are simplified and do not use an accurate proportion, that is, the drawings are merely for the objectives of conveniently and clearly assisting in illustrating embodiments of the present disclosure.

Figure 1:
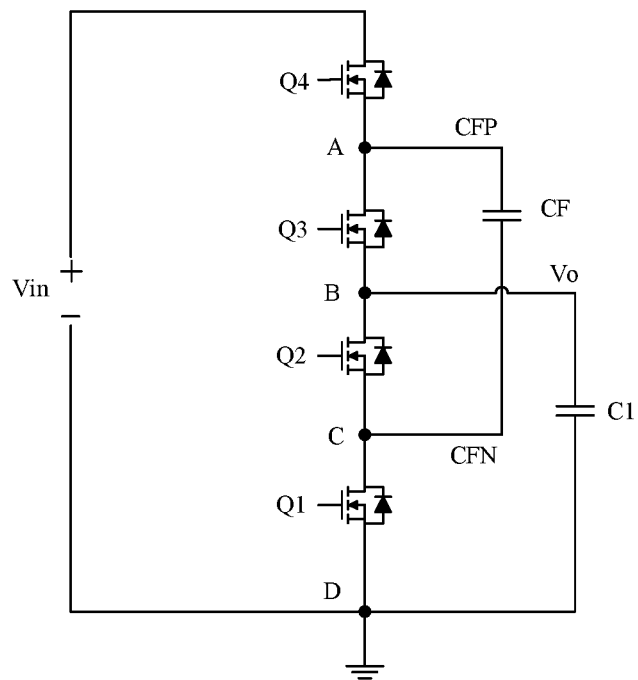
FIG. 1 illustrates a topological structure of an existing SCC.
Figure 2:
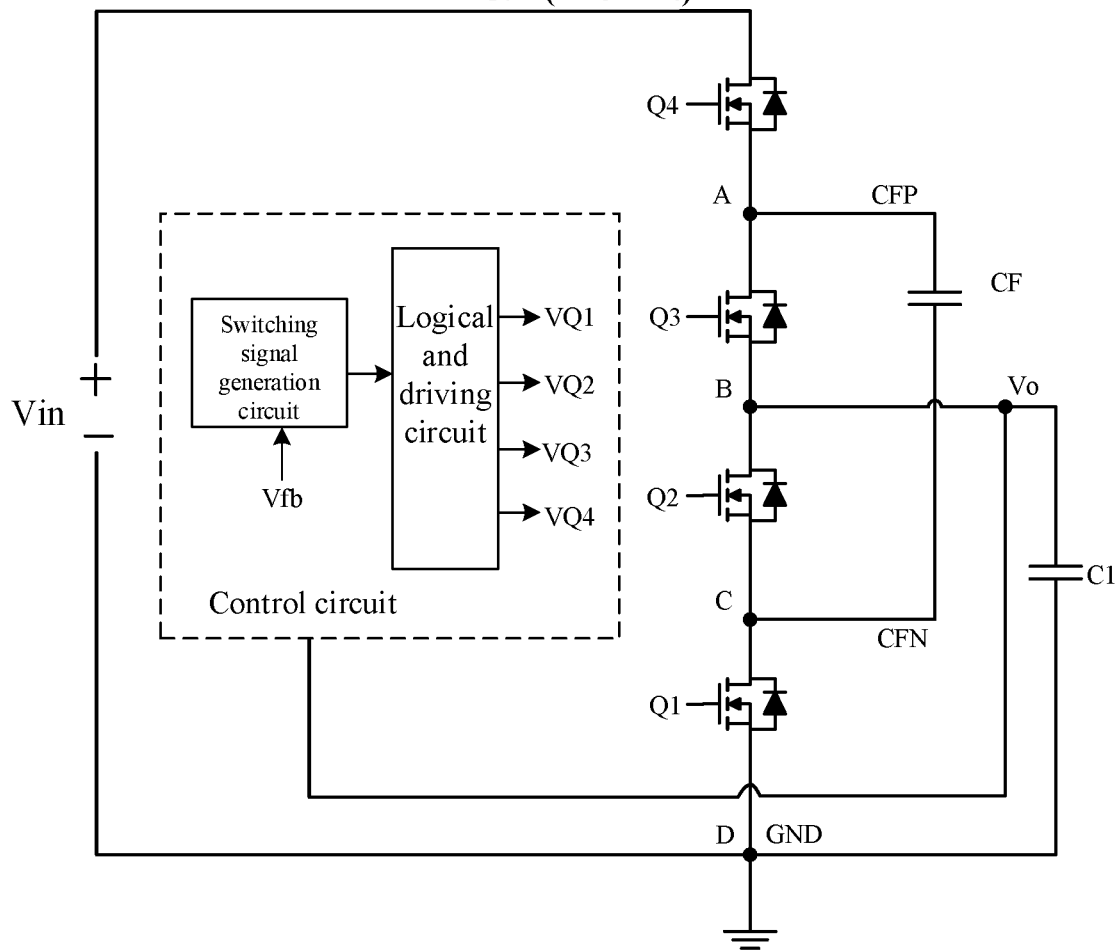
FIG. 2 is a block diagram of a control circuit for an SCC according to the present disclosure.
Figure 3:
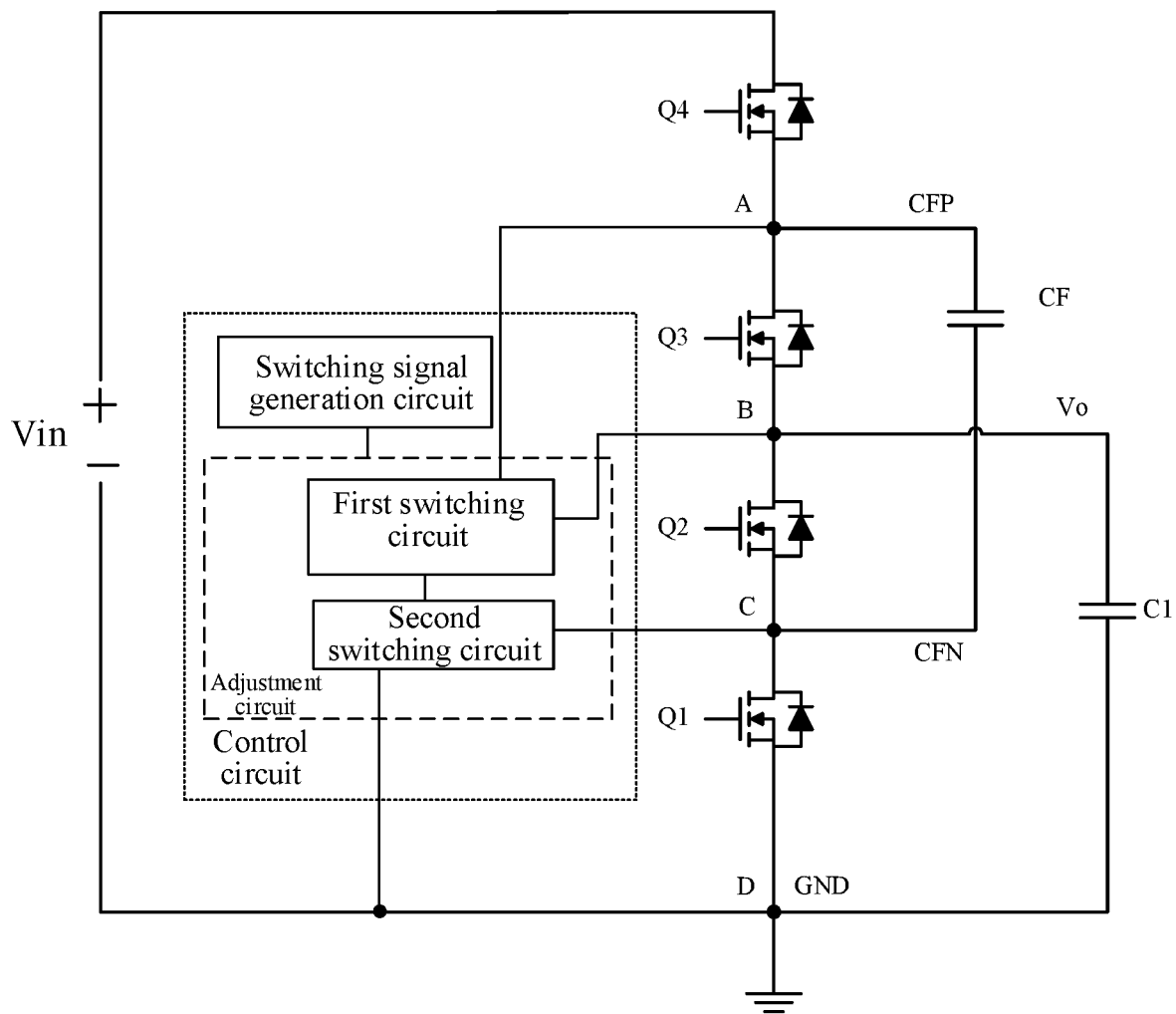
FIG. 3 is a block diagram of an adjustment circuit for an SCC according to the present disclosure.
Figure 4:
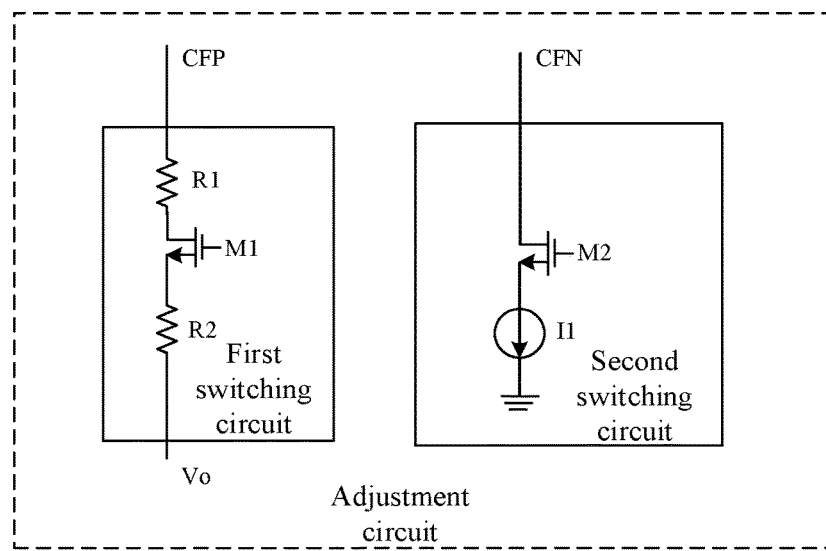
FIG. 4 is a specific diagram of the adjustment circuit in FIG. 3.

FIG. 2 is a block diagram of a control circuit for an SCC according to the present disclosure. FIG. 3 is a block diagram of an adjustment circuit for an SCC according to the present disclosure. FIG. 4 is a specific diagram of the adjustment circuit in FIG. 3. The SCC in the present disclosure includes first switching transistor Q1, second switching transistor Q2, third switching transistor Q3 and fourth switching transistor Q4 sequentially connected between a reference ground and an input voltage, flying capacitor CF, and output capacitor C1. The flying capacitor CF includes a first terminal connected to a common node for the first switching transistor Q1 and the second switching transistor Q2, and a second terminal connected to a common node for the third switching transistor Q3 and the fourth switching transistor Q4. The output capacitor C1 includes a first terminal connected to the reference ground, and a second terminal voltage as output voltage Vo of the SCC. In the embodiment of the present disclosure, in response to 2:1 step-down conversion of the SCC, the switching transistors approximately have a duty cycle of 0.5. The switching transistor Q1 and the switching transistor Q3, as well as the switching transistor Q2 and the switching transistor Q4, are turned on or off complementarily. The first switching transistor Q1, the second switching transistor Q2, the third switching transistor Q3 and the fourth switching transistor Q4 are an N-type metal oxide semiconductor (NMOS) transistor.

As shown in FIG. 2, the control circuit for the SCC includes a switching signal generation circuit, and a logical and driving circuit. According to output feedback signal Vfb, the switching signal generation circuit generates a switching control signal for controlling the first switching transistor Q1, the second switching transistor Q2, the third switching transistor Q3 and the fourth switching transistor Q4. For example, it generates a first switching control signal to turn on or off the first switching transistor Q1, generates a second switching control signal to turn on or off the second switching transistor Q2, and generates a third switching control signal to turn on or off the third switching transistor Q3. The logical and driving circuit receives a switching control signal and a driving voltage of each switching transistor, and generates a corresponding switching driving signal according to the switching control signal to turn on or off the corresponding switching transistor.

In an example, referring to FIG. 3, the control circuit includes an adjustment circuit. The adjustment circuit receives a first terminal voltage and a second terminal voltage of the flying capacitor, and pulls down the first terminal voltage and the second terminal voltage of the flying capacitor through a pull-down signal to make two terminal voltages of the flying capacitor consistent with the output voltage. Herein, the pull-down signal refers to a current signal having a current value within a preset range. The preset range is greater than zero and less than 1 A. For example, the pull-down current may be 800 mA, 500 mA or 100 mA. Before the SCC works formally, the switching signal generation circuit turns off the first switching transistor, the second switching transistor, the third switching transistor and the fourth switching transistor. After the two terminal voltages of the flying capacitor are consistent with the output voltage, the switching signal generation circuit controls the first switching transistor, the second switching transistor, the third switching transistor and the fourth switching transistor to work for voltage conversion.

Exemplarily, after the adjustment circuit adjusts the second terminal voltage of the flying capacitor to a same potential as the second terminal voltage of the output capacitor, the switching signal generation circuit turns on the third switching transistor, and the adjustment circuit adjusts the first terminal voltage of the flying capacitor to a same potential as the reference ground. Therefore, the two terminal voltages of the flying capacitor are consistent with the output voltage. Herein, the term "consistent" refers to that the two terminal voltages CVF of the flying capacitor are the same as or similar to the output voltage. According to the above method, before the SCC works formally, voltages at two terminals of the flying capacitor are adjusted with a small current signal, such that two terminal voltages of the flying capacitor are consistent with the output voltage. Before the SCC works formally, the circuit can achieve a controllable voltage, thereby protecting components in the circuit from a large current impact, and preventing damage to the components.

In an example, as shown in FIG. 4, the pull-down signal includes a first pull-down signal and a second pull-down signal. The adjustment circuit pulls down the second terminal voltage of the flying capacitor through the first pull-down signal to a same potential as the second terminal voltage of the output capacitor. The adjustment circuit pulls down the first terminal voltage of the flying capacitor through the second pull-down signal to a same potential as the reference ground. Specifically, the adjustment circuit includes a first switching circuit and a second switching circuit. The first switching circuit includes any one of a switching transistor, a resistor and a switching transistor connected in series, and a switching transistor and a current source connected in series. The second switching circuit includes any one of a switching transistor, a resistor and a switching transistor connected in series, and a switching transistor and a current source connected in series. In FIG. 4, for example, the first switching circuit includes resistors R1, R2 and switching transistor M1 connected in series, and the second switching circuit includes switching transistor M2 and current source I1 connected in series. Two terminals of the first switching circuit are respectively connected to the second terminal of the flying capacitor to receive voltage CFP and a second terminal of the output capacitor to receive voltage Vo. Two terminals of the second switching circuit are respectively connected to the first terminal of the flying capacitor to receive voltage CFN and the reference ground. A working current of the first switching circuit serves as the first pull-down signal. A working current of the second switching circuit serves as the second pull-down signal. Herein, the first pull-down signal and the second pull-down signal each have a current of greater than zero and less than 1 A.

Referring to FIG. 3 and FIG. 4, the two terminal voltages of the flying capacitor CF are discharged through a body diode of the first switching transistor Q1 when higher than the output voltage. When the two terminal voltages of the flying capacitor CF are lower than the output voltage, the voltage CFP of the flying capacitor is pull down through the first pull-down signal. With the above method, the voltage CFP of the flying capacitor can be pulled to be the same as the second terminal voltage of the output capacitor. The switching signal generation circuit turns on the third switching transistor, and pulls down the first terminal voltage of the flying capacitor through the second pull-down signal to a same potential as the reference ground. Therefore, the two terminal voltages of the flying capacitor are consistent with the output voltage. Herein, turning on the third switching transistor is to ensure that the second terminal voltage of the flying capacitor keeps a same potential as the second terminal voltage of the output capacitor. In this case, the second terminal voltage of the flying capacitor is not pulled with the small current.

In another example, the adjustment circuit pulls down the second terminal voltage of the flying capacitor through the pull-down signal to a same potential as the second terminal voltage of the output capacitor. The adjustment circuit pulls down the first terminal voltage of the flying capacitor through the pull-down signal to a same potential as the reference ground. The adjustment circuit includes a switching circuit. Exemplarily, the switching circuit includes any one of a switching transistor, a resistor and a switching transistor connected in series, and a switching transistor and a current source connected in series. Two terminals of the switching circuit are respectively connected to the second terminal of the flying capacitor and a second terminal of the output capacitor. After the second terminal voltage of the flying capacitor is pulled down to the same potential as the second terminal voltage of the output capacitor, the two terminals of the switching circuit are connected to the first terminal of the flying capacitor and the reference ground. A working current of the switching circuit serves as the pull-down signal. In the embodiment, the second terminal voltage of the flying capacitor is pulled down with the pull-down signal. Then, a connection point of the switching circuit can be switched. The first terminal voltage of the flying capacitor is pulled down with the pull-down signal. The embodiment can make the structure of the switching circuit simple.

Figure 5:
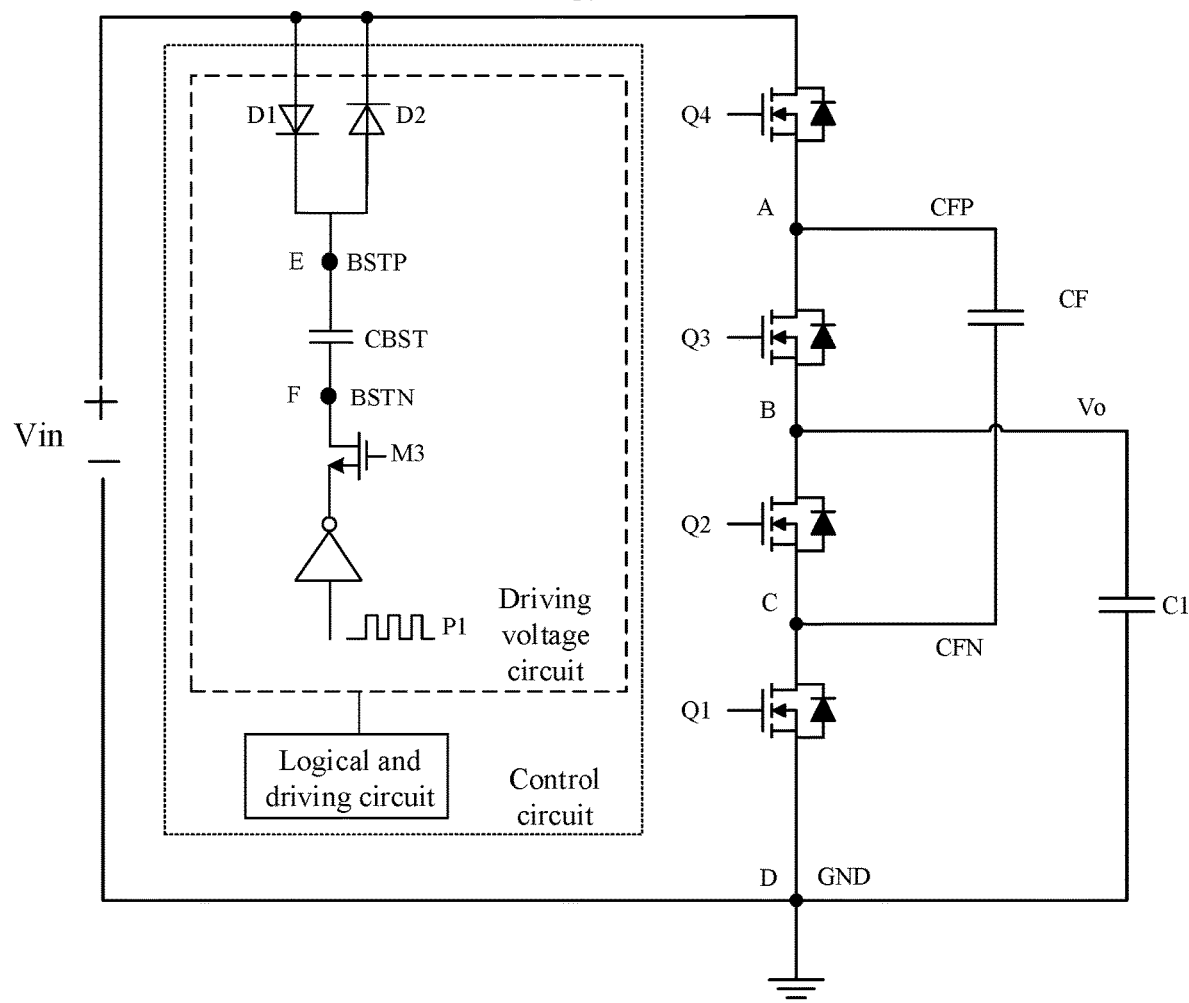
FIG. 5 is a specific diagram of a driving voltage circuit according to the present disclosure.

Referring to FIG. 5, the control circuit further includes a driving voltage circuit. The driving voltage circuit includes bootstrap capacitor CBST. The bootstrap capacitor CBST provides a driving voltage for the logical and driving circuit in the control circuit. The logical and driving circuit drives the fourth switching transistor according to the driving voltage. An upper pole plate of the bootstrap capacitor is connected to the input voltage through diode D1. A lower pole plate of the bootstrap capacitor is connected to switch M3 to receive pulse signal P1. The diode D1 is turned on, such that the bootstrap capacitor is charged through the input voltage Vin. The switch M3 is turned on to pull down a terminal voltage of the lower pole plate of the bootstrap capacitor through a first signal. After the terminal voltage of the lower pole plate is pulled down to a zero potential, the switching signal generation circuit controls the first switching transistor, the second switching transistor, the third switching transistor and the fourth switching transistor to work for the voltage conversion. Schematically, the first signal refers to a current signal having a current value within a preset range. The preset range is greater than zero and less than 1 A. Herein, the driving voltage circuit further prevents backward flowing of the input voltage through the diode D2. The switch M3 is a high-voltage NMOS transistor. After the terminal voltage of the lower pole plate is pulled down to the zero potential, the bootstrap capacitor CBST is fully charged and can provide power normally. Therefore, controlling the first switching transistor, the second switching transistor, the third switching transistor and the fourth switching transistor to work for the voltage conversion can ensure stable power supply of the circuit. In the embodiment, when the driving voltage circuit charges the bootstrap capacitor, the voltage of the lower pole plate is pulled down with the small current. In case of a failure of the bootstrap capacitor, such as a short circuit, the bootstrap capacitor is not damaged for a large charging current. In the embodiment, due to a high source voltage of the fourth switching transistor, a high driving voltage is required to drive the switching transistor Q4 to work. Driving voltages of other three switching transistors may be provided by a voltage at a node such as a node A or a node B in the circuit, and may also not be provided by an individual driving circuit. Certainly, the driving voltages of other three switching transistors can also be provided by the driving voltage circuit in the embodiment.

Further, the SCC includes two phases of structurally same SC circuits. The first switching transistor, the second switching transistor, the third switching transistor, the fourth switching transistor and the flying capacitor form a first phase of SC circuit. A frequency of the pulse signal is twice a switching frequency of each of the SC circuits, so as to meet power supply of the two phases of SC circuits. The two phases of SC circuits share one output capacitor, and their output voltages are respectively a half of the input voltage. Waves of the input voltages and the output voltages of the two phases are counteracted with each other. Therefore, the input voltage and the output voltage of the SCC each have a smaller wave.

Figure 6:
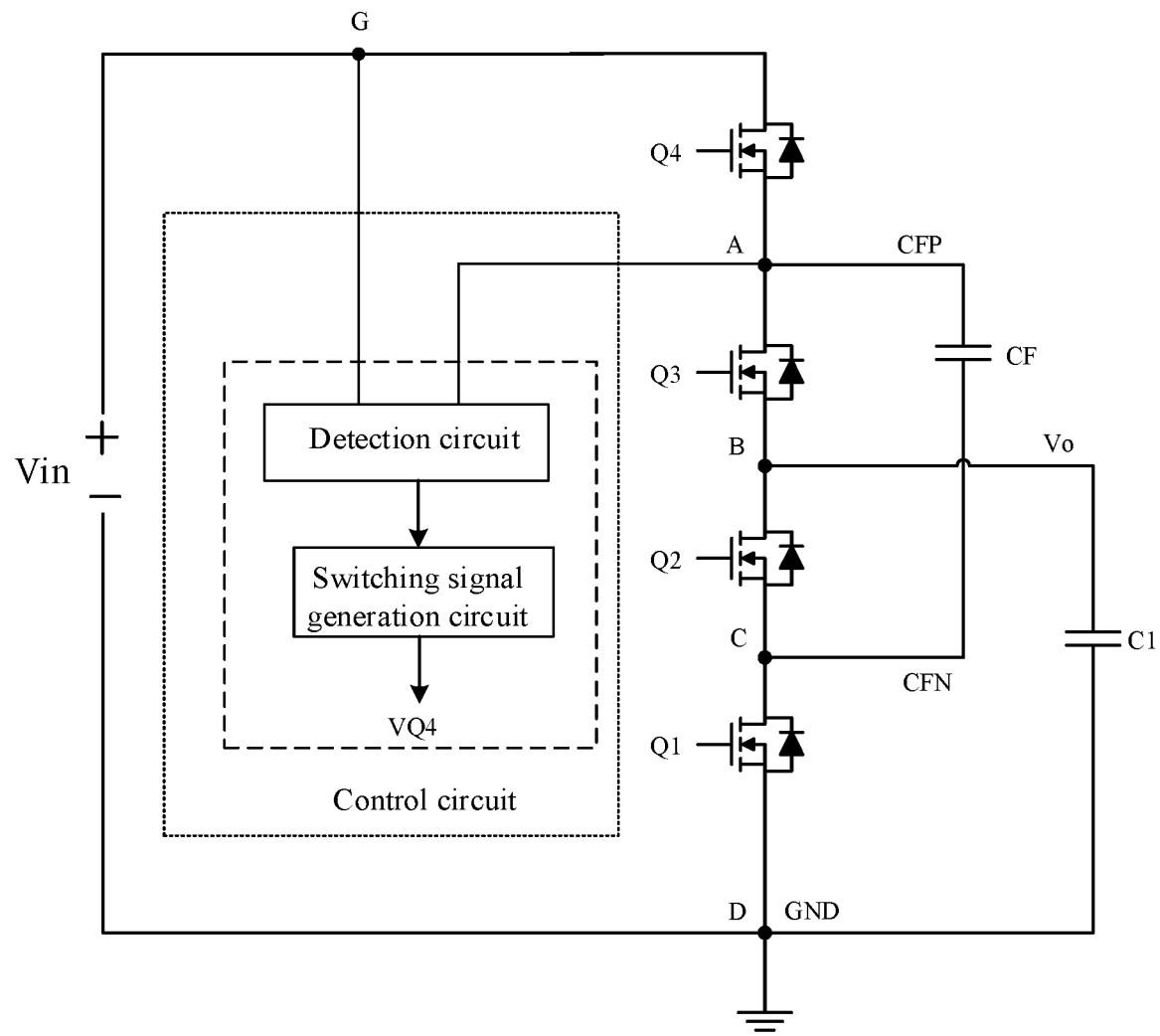
FIG. 6 is a specific diagram of a detection circuit according to the present disclosure.

Referring to FIG. 6, the control circuit further includes a detection circuit. After the first switching transistor and the third switching transistor are turned off, the switching signal generation circuit generates a second switching control signal to turn on the second switching transistor. The detection circuit detects the second terminal voltage of the flying capacitor, as well as a voltage difference between the second terminal voltage of the flying capacitor and the input voltage. When an absolute value of the voltage difference falls within a preset range, the switching signal generation circuit generates a fourth switching control signal to turn on the fourth switching transistor. For example, the preset range is from zero to 500 mA. Herein, the second terminal voltage of the flying capacitor is greater than or equal to a difference between the input voltage and a fixed voltage, and less than a sum of the input voltage and the fixed voltage. The fixed voltage may be any value from 0 mA to 500 mA. The method can detect whether the two terminal voltages of the flying capacitor are the same as the output voltage. If not, adjustment can be made according to a condition. For example, the input voltage is adjusted, such that the two terminal voltages are consistent. Then, the fourth switching transistor is turned on to prevent the damage on the switching transistor from the large current impact.

The implementations described above do not constitute a limitation on the scope of protection of the technical solution of the present disclosure. Any modification, equivalent replacement, and improvement made within the spirit and principle of the above implementations should fall within the scope of protection of the technical solution of the present disclosure.

What is claimed is:

1. A control circuit for a switched capacitor converter (SCC), wherein the SCC comprises a first switching transistor, a second switching transistor, a third switching transistor, a fourth switching transistor, a flying capacitor, and an output capacitor, wherein the first switching transistor, the second switching transistor, the third switching transistor, and the fourth switching transistor are sequentially connected between a reference ground and an input voltage;

the flying capacitor comprises a first terminal connected to a common node for the first switching transistor and the second switching transistor, and a second terminal connected to a common node for the third switching transistor and the fourth switching transistor; the output capacitor comprises a first terminal connected to the reference ground, and a second terminal voltage as an output voltage of the SCC; and the control circuit comprises a switching signal generation circuit and an adjustment circuit;

the switching signal generation circuit is configured to generate switching control signals for controlling the first switching transistor, the second switching transistor, the third switching transistor and the fourth switching transistor;

the adjustment circuit receives a first terminal voltage and a second terminal voltage of the flying capacitor, and pulls down the first terminal voltage and the second terminal voltage of the flying capacitor through a pull-down signal to make the first and second terminal voltages of the flying capacitor consistent with the output voltage; and the switching signal generation circuit turns off the first switching transistor, the second switching transistor, the third switching transistor and the fourth switching transistor; and after the first and second terminal voltages of the flying capacitor are consistent with the output voltage, the switching signal generation circuit controls the first switching transistor, the second switching transistor, the third switching transistor and the fourth switching transistor to work for a voltage conversion, wherein, after the adjustment circuit adjusts the second terminal voltage of the flying capacitor to a same potential as the second terminal voltage of the output capacitor, the switching signal generation circuit turns on the third switching transistor, and the adjustment circuit adjusts the first terminal voltage of the flying capacitor to a same potential as the reference ground.

2. The control circuit according to claim 1, wherein the pull-down signal refers to a current signal having a current value within a preset range; and the preset range is greater than zero and less than 1 A.

3. A control circuit for a switched capacitor converter (SCC), wherein the SCC comprises a first switching transistor, a second switching transistor, a third switching transistor, a fourth switching transistor, a flying capacitor, and an output capacitor, wherein the first switching transistor, the second switching transistor, the third switching transistor, and the fourth switching transistor are sequentially connected between a reference ground and an input voltage;

the flying capacitor comprises a first terminal connected to a common node for the first switching transistor and the second switching transistor, and a second terminal connected to a common node for the third switching transistor and the fourth switching transistor; the output capacitor comprises a first terminal connected to the reference ground, and a second terminal voltage as an output voltage of the SCC; and the control circuit comprises a switching signal generation circuit and an adjustment circuit;

the switching signal generation circuit is configured to generate switching control signals for controlling the first switching transistor, the second switching transistor, the third switching transistor and the fourth switching transistor;

the adjustment circuit receives a first terminal voltage and a second terminal voltage of the flying capacitor, and pulls down the first terminal voltage and the second terminal voltage of the flying capacitor through a pull-down signal to make the first and second terminal voltages of the flying capacitor consistent with the output voltage; and the switching signal generation circuit turns off the first switching transistor, the second switching transistor, the third switching transistor and the fourth switching transistor; and after the first and second terminal voltages of the flying capacitor are consistent with the output voltage, the switching signal generation circuit controls the first switching transistor, the second switching transistor, the third switching transistor and the fourth switching transistor to work for a voltage conversion, wherein the adjustment circuit pulls down the second terminal voltage of the flying capacitor through the pull-down signal to a same potential as the second terminal voltage of the output capacitor; and the adjustment circuit pulls down the first terminal voltage of the flying capacitor through the pull-down signal to a same potential as the reference ground.

4. The control circuit according to claim 3, wherein the adjustment circuit comprises a switching circuit; two terminals of the switching circuit are respectively connected to the second terminal of the flying capacitor and a second terminal of the output capacitor; and after the second terminal voltage of the flying capacitor is pulled down to the same potential as the second terminal voltage of the output capacitor, the two terminals of the switching circuit are connected to the first terminal of the flying capacitor and the reference ground; and a working current of the switching circuit serves as the pull-down signal.

5. The control circuit according to claim 4, wherein the switching circuit comprises any one selected from the group consisting of a switching transistor, a resistor and a switching transistor connected in series, and a switching transistor and a current source connected in series.

6. The control circuit according to claim 1, wherein the pull-down signal comprises a first pull-down signal and a second pull-down signal;

the adjustment circuit pulls down the second terminal voltage of the flying capacitor through the first pull-down signal to a the same potential as the second terminal voltage of the output capacitor; and the adjustment circuit pulls down the first terminal voltage of the flying capacitor through the second pull-down signal to a the same potential as the reference ground.

7. The control circuit according to claim 6, wherein the adjustment circuit comprises a first switching circuit and a second switching circuit;

two terminals of the first switching circuit are respectively connected to the second terminal of the flying capacitor and a second terminal of the output capacitor;

two terminals of the second switching circuit are respectively connected to the first terminal of the flying capacitor and the reference ground; and a working current of the first switching circuit serves as the first pull-down signal; and a working current of the second switching circuit serves as the second pull-down signal.

8. The control circuit according to claim 7, wherein the first switching circuit comprises any one selected from the group consisting of a switching transistor, a resistor and a switching transistor connected in series, and a switching transistor and a current source connected in series; and the second switching circuit comprises any one selected from the group consisting of a switching transistor, a resistor and a switching transistor connected in series, and a switching transistor and a current source connected in series.

9. The control circuit according to claim 1, wherein the control circuit further comprises a driving voltage circuit;

the driving voltage circuit comprises a bootstrap capacitor; the bootstrap capacitor provides a driving voltage for a logical and driving circuit in the control circuit; an upper pole plate of the bootstrap capacitor is connected to the input voltage through a diode; and a lower pole plate of the bootstrap capacitor is connected to a switch to receive a pulse signal;

the diode is turned on, wherein the bootstrap capacitor is charged through the input voltage; and the switch is turned on to pull down a terminal voltage of the lower pole plate of the bootstrap capacitor through a first signal; and after the terminal voltage of the lower pole plate is pulled down to a zero potential, the switching signal generation circuit controls the first switching transistor, the second switching transistor, the third switching transistor and the fourth switching transistor to work for the voltage conversion.

10. The control circuit according to claim 9, wherein the first signal refers to a current signal having a current value within a preset range; and the preset range is greater than zero and less than 1 A.

11. The control circuit according to claim 9, wherein the SCC comprises two phases of structurally same switched capacitor (SC) circuits; and the first switching transistor, the second switching transistor, the third switching transistor, the fourth switching transistor and the flying capacitor form a first phase of SC circuit; and a frequency of the pulse signal is twice a switching frequency of each of the structurally same SC circuits.

12. The control circuit according to claim 1, wherein the control circuit further comprises a detection circuit;

after the first switching transistor and the third switching transistor are turned off, the switching signal generation circuit generates a second switching control signal to turn on the second switching transistor;

the detection circuit detects the second terminal voltage of the flying capacitor, as well as a voltage difference between the second terminal voltage of the flying capacitor and the input voltage; and when an absolute value of the voltage difference falls within a preset range, the switching signal generation circuit generates a fourth switching control signal to turn on the fourth switching transistor.

13. A control method for a SCC, wherein the SCC comprises a first switching transistor, a second switching transistor, a third switching transistor, a fourth switching transistor, a flying capacitor, and an output capacitor, wherein the first switching transistor, the second switching transistor, the third switching transistor, and the fourth switching transistor are sequentially connected between a reference ground and an input voltage;

the flying capacitor comprises a first terminal connected to a common node for the first switching transistor and the second switching transistor, and a second terminal connected to a common node for the third switching transistor and the fourth switching transistor; the output capacitor comprises a first terminal connected to the reference ground, and a second terminal voltage as an output voltage of the SCC; and the control method comprises the following steps:

turning off the first switching transistor, the second switching transistor, the third switching transistor and the fourth switching transistor;

pulling down a first terminal voltage and a second terminal voltage of the flying capacitor through a pull-down signal to make the first and second terminal voltages of the flying capacitor consistent with the output voltage; and allowing, after the first and second terminal voltages of the flying capacitor are consistent with the output voltage, a switching signal generation circuit to control the first switching transistor, the second switching transistor, the third switching transistor and the fourth switching transistor to work for a voltage conversion, wherein the method further comprises:

turning on the second switching transistor after the first switching transistor and the third switching transistor are turned off; and detecting the second terminal voltage of the flying capacitor, as well as a voltage difference between the second terminal voltage of the flying capacitor and the input voltage; and turning on the fourth switching transistor when an absolute value of the voltage difference falls within a preset range.

14. The control method according to claim 13, wherein the preset range is a first preset range, and wherein the pull-down signal refers to a current signal having a current value within a second preset range; and the second preset range is greater than zero and less than 1 A.

15. The control method according to claim 13, wherein the step of pulling down the first terminal voltage and the second terminal voltage of the flying capacitor through the pull-down signal to make the first and second terminal voltages of the flying capacitor consistent with the output voltage specifically comprises:

adjusting the second terminal voltage of the flying capacitor through the pull-down signal to a same potential as the second terminal voltage of the output capacitor;

allowing the switching signal generation circuit to turn on the third switching transistor; and adjusting the first terminal voltage of the flying capacitor through the pull-down signal to a same potential as the reference ground.

16. The control method according to claim 13, the preset range is a first preset range, and wherein the method further comprises:
providing a driving voltage through a bootstrap capacitor, wherein
an upper pole plate of the bootstrap capacitor is connected to the input voltage through a diode, a lower pole plate of the bootstrap capacitor is connected to a switch to receive a pulse signal;
turning on the diode, wherein the bootstrap capacitor is charged through the input voltage; and turning on the switch to pull down a terminal voltage of the lower pole plate of the bootstrap capacitor through a first signal, wherein the first signal refers to a current signal having a current value within a second preset range; and
controlling, after the terminal voltage of the lower pole plate is pulled down to a zero potential, the first switching transistor, the second switching transistor, the third switching transistor and the fourth switching transistor to work for the voltage conversion.

* * * * *